Patented Nov. 7, 1950

2,528,606

UNITED STATES PATENT OFFICE 2,528,606

MOLDING POWDER CONTAINING ORGANO-SILOXANE RESIN AND ETHANOLAMINE

William W. Pedersen, Cleveland Heights, Ohio, assignor to Dow Corning Corporation, Midland, Mich., a corporation of Michigan No Drawing. Application April 16, 1946,
Serial No. 662,606

3 Claims. (Cl. 260—37)

The present invention relates to methods of molding in which molding powders are employed, and to the novel molding powders, per se.

In general, molding powders which are known in the art produce molded articles which do not have substantial thermal stability, inasmuch as they are based upon organic resins. This is true even of the thermosetting phenol formaldehyde type of resin.

Objects of the present invention are to provide novel molding powders and methods of molding such powders which provide molded pieces of improved thermal stability.

The molding powders of the present invention comprise an inorganic filler impregnated with an organosiloxane resin and an ethanolamine. The organosiloxane resin in the molding powder is preferably in a partially cured state. The molding powders hereof are molded under pressure either at room temperature or at elevated temperature. Following molding they may be cured, if desired, by heating as in an oven.

The siloxane resins employed can be cured in deep section. These resins are soluble in toluene and have a degree of substitution between 0.5 and 1.4 organo groups per silicon atom. The organo groups referred to are linked to the silicon by carbon to silicon bonds, and the silicon atoms are linked by Si-O-Si structures. At least a portion, and preferably at least 25% of the monoorganosiloxane units are alkylsiloxane units in which the alkyl radicals contain less than five carbon atoms each. The remainder of the monoorganosiloxane may be phenyl or higher alkyl substituted. Partially condensed resins of the type here involved are obtainable by the hydrolysis of the corresponding chloride or ethoxy derivatives in water, preferably in the presence of a collecting solvent, such as toluene, in which the hydrolyzate is soluble. The solution of hydrolyzate in solvent may be refluxed and then washed to neutrality. Other suitable methods may be employed for the preparation of these partially condensed resins.

Suitable resins and their preparation are disclosed in greater detail in the copending applications of E. L. Warrick, Serial No. 567,901, filed December 12, 1944, now abandoned and of Fenn and Rauner Serial Nos. 642,438, now U. S. Patent 2,517,777; 642,439, now abandoned, and 642,440, now abandoned; all filed on January 21, 1946.

Resins of this type are generally best handled in solution, the customary organic solvents being suitable; such as ethyl alcohol, isopropyl alcohol, benzene, toluene and the like.

The molding powder likewise includes an ethanolamine generally in amount less than 5% based on the resin present. Mono-, di-, and triethanolamine have been found to be equivalents in their action on the siloxane resins here employed.

The inorganic filler which is employed may be in powder or fibrous form. Preferred fillers are inorganic fibrous materials, such as copper, asbestos, and glass fiber. Other fillers, such as crushed flint, crushed quartz, crushed glass, clays, titania, zinc oxide and the like may also or alternatively be employed.

In the molding powder, the resin and the ethanolamine are in impregnated state in the filler, forming a coating on the filler. The powder may be produced by either simultaneously or separately impregnating the filler with the resin and the ethanolamine, using either a common solution of the two or separate solutions thereof.

The mixture of filler and solution is dried to remove the solvent. If desired, a conventional mold lubricant may be added to the mixture preferably before drying. The resin in the mixture is then partially cured, which can be effected by heating. It is advantageous to grind the partially cured mixture in order to obtain uniform results in the subsequent molding operation.

The powder so produced may be molded either at room temperature or at an elevated temperature up to about 300° C. When the molding is done at room temperature, the molded product is desirably cured in an oven. This type of operation is desirable, since the molding press is not employed for a major portion of the time for curing of the molded products. Alternatively the molding may be effected at elevated temperature. When the molding is effected in this manner partial or complete curing may be effected in the press. It is preferred that the resin be only partially cured when the product is removed from the press and that the resin receive a final cure in an oven or the like.

The extent of cure effected at any stage of the processing is a function both of time and temperature. Precuring of the molding powder is preferably effected in the range of 80° to 300° C. When partial or final curing is effected in the molding operation, the temperature employed preferably is above that employed in the precuring of the molding powder and below 300° C. Lower temperatures may be employed, but in this event the rate of curing in the mold is low. When final curing is effected as in an oven, the temperature is preferably above that at which the material has theretofore been subjected and below 300° C. A preferred operation involves partially curing the powder at a temperature above 100° C., molding at a higher temperature than that during partial curing of the powder, and finally curing in an oven at a temperature higher than employed during molding and below 300° C.

The incorporation of an ethanolamine in the molding powder gives hard strong molded products without loss of resin during molding in the press and shortens to a substantial extent the curing time. A partial cure of the resin in the powder is obtained which does not prevent coherence in molding and subsequent curing.

The following examples are illustrative of the product and method of this invention, and should not be considered as definitive of the scope thereof.

Example 1

A 60.4% solution of a siloxane resin in toluene was employed for the production of molding powder. The resin contained 2.4 mol. per cent of trimethyl siloxane units, 34 mol. per cent of phenyl siloxane units and 63.4 mol. per cent of methyl siloxane units. The degree of substitution of the resin was 1.048 organo groups per silicon atom and the resin contained primarily cyclic structures.

A mixture was prepared of the following indicated materials in the proportions by weight stated:

| | |
|---|---|
| 60.4% toluene solution of above resin | 328 |
| 10% toluene solution of triethanolamine | 10 |
| Toluene | 107 |
| Asbestos | 200 |
| Flint (200 mesh) | 100 |
| Calcium stearate | 10 |

To effect thorough mixing this was run twice through a three roll mill. The mixture was then precured for ten minutes at 140° C. and ground. The molding powder so produced was placed in a mold shaped for the production of crucibles and subjected to 1000 pounds per square inch pressure for one hour at 175° C. The crucibles were removed from the mold and cured in an oven for 2 hours at 140° C., for one hour at 200° C., and one hour at 250° C.

Similar products have been made using glass fiber instead of asbestos. Equivalent action on the resin may be obtained with monoethanolamine and diethanolamine.

Example 2

The molding powder described in Example 1 was molded in the same molds at 1000 pounds per square inch at room temperature and cured in an oven on the same schedule as described in Example 1. The crucibles so produced were slightly weaker than those of Example 1, but were entirely satisfactory for their intended purpose.

I claim:

1. A molding powder composed of an inorganic filler, an organosiloxane resin in which the organic groups are methyl and phenyl radicals, and an ethanolamine in amount from 0.4% to 5.0% by weight of said siloxane, said resin containing between 0.5 and 1.4 organic groups per silicon atom, and being in a partially condensed state, and said inorganic filler being coated with the resin.

2. A molding powder in accordance with claim 1 in which the inorganic filler is a fibrous material and is coated with the resin.

3. A molding powder in accordance with claim 1 in which at least 25% of the monoorganosiloxane units of said resin contain methyl radicals.

WILLIAM W. PEDERSEN.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,337,523 | Lum | Dec. 21, 1943 |
| 2,375,998 | McGregor et al. | May 15, 1945 |
| 2,389,807 | McGregor et al. | Nov. 27, 1945 |
| 2,442,212 | Rochow | May 25, 1948 |

OTHER REFERENCES

Journ. Ind. and Eng. Chem., Mar. 1909, pages 156 and 158.

The Technology of Plastics and Resins, by D. Van Nostrand Co., published 1945; page 122.